(12) United States Patent
Smith

(10) Patent No.: US 11,041,610 B1
(45) Date of Patent: Jun. 22, 2021

(54) LATERALLY EXTENDING BACKUP LIGHT FOR TRAILER OF TRUCK

(71) Applicant: James C. Smith, Carthage, MS (US)

(72) Inventor: James C. Smith, Carthage, MS (US)

( * ) Notice: Subject to any disclaimer, the term of this patent is extended or adjusted under 35 U.S.C. 154(b) by 0 days.

(21) Appl. No.: 16/891,737

(22) Filed: Jun. 3, 2020

(51) Int. Cl.
  *F21V 21/22* (2006.01)
  *F21V 21/30* (2006.01)
  *B60Q 1/22* (2006.01)

(52) U.S. Cl.
  CPC .............. *F21V 21/22* (2013.01); *B60Q 1/22* (2013.01); *F21V 21/30* (2013.01)

(58) Field of Classification Search
  CPC ........... F21V 21/22; F21V 21/30; B60Q 1/22; B60Q 1/2615; B60Q 1/2619; B60Q 1/2657; B60Q 1/2692; B60Q 3/57
  See application file for complete search history.

(56) References Cited

U.S. PATENT DOCUMENTS

| | | | | |
|---|---|---|---|---|
| 4,855,878 A | * | 8/1989 | Vu | B60Q 1/22 362/506 |
| 4,894,755 A | * | 1/1990 | Chandler | B60Q 1/2692 340/472 |
| 5,023,760 A | * | 6/1991 | Izuno | B60Q 1/2692 362/485 |
| 5,281,948 A | * | 1/1994 | Estrada | B60Q 1/50 340/433 |
| 5,406,251 A | * | 4/1995 | Leis | B60Q 1/50 116/39 |
| 5,430,625 A | * | 7/1995 | Abarr | B60Q 1/22 340/431 |
| 5,682,138 A | * | 10/1997 | Powell | B60Q 1/326 340/431 |
| 5,743,635 A | * | 4/1998 | Hulse | B60Q 1/2657 362/385 |
| 5,923,124 A | * | 7/1999 | Paech | B60Q 1/46 315/80 |
| 6,260,990 B1 | | 7/2001 | Saunders | |
| 6,409,367 B1 | | 6/2002 | Pratt | |
| 6,923,564 B2 | | 8/2005 | Steward | |

(Continued)

FOREIGN PATENT DOCUMENTS

EP          3351429 A1    1/2018

*Primary Examiner* — Jong-Suk (James) Lee
*Assistant Examiner* — James M Endo
(74) *Attorney, Agent, or Firm* — George L Williamson

(57) ABSTRACT

Method and apparatus for a laterally extendable backup light system for placement on the trailer of the 18-wheeler tractor trailer truck device. The light is mounted underneath an outer edge of the trailer of the tractor-trailer so that they would be extendable laterally away from the edge of the trailer so that the light portion of the present invention would extend far enough outwardly to travel beyond the outer edge of the trailer so that the beam of light emanating therefrom would illuminate the area behind the rear of the trailer. An air cylinder operated by an electrical actuator controlled by the driver and/or the transmission of the truck would actuate the light portion so that the light portion would extends from an enclosure and beyond the edge of the trailer of the truck-trailer when the transmission is placed in reverse and then the light portion would be retracted back into the enclosure by an electrical actuator when the transmission is taken out of reverse.

8 Claims, 3 Drawing Sheets

(56) References Cited

U.S. PATENT DOCUMENTS

| | | | |
|---|---|---|---|
| 7,791,464 B1* | 9/2010 | Giddings | B60Q 1/50 340/472 |
| 2003/0063475 A1 | 4/2003 | Simmons | |
| 2004/0100803 A1* | 5/2004 | Steward | B60Q 1/05 362/505 |
| 2008/0272699 A1* | 11/2008 | Capenos | B60Q 1/0088 315/77 |
| 2012/0268960 A1* | 10/2012 | Kiser | B60Q 1/24 362/485 |
| 2014/0016337 A1* | 1/2014 | Younger | B60Q 1/22 362/485 |
| 2014/0362598 A1* | 12/2014 | Racicot | E01F 9/662 362/542 |
| 2016/0347247 A1 | 12/2016 | Espey et al. | |

* cited by examiner

LATERALLY EXTENDING BACKUP LIGHT FOR TRAILER OF TRUCK

BACKGROUND OF THE INVENTION

Field of the Invention

The present invention relates generally to appurtenances for vehicles, and more particularly, is concerned with a backup light for placement on the trailer of an 18-wheeler type tractor trailer truck.

Description of the Related Art

Devices relevant to the present invention have been described in the related art; however, none of the related art devices disclose the unique features of the present invention.

In U.S. Patent Application Publication No. 2016/0347247 dated Dec. 1, 2016, Espey, et al., disclosed a vehicle mountable safety light system. In United States Patent Application Publication No. 2003/0063475 dated Apr. 3, 2003, Simmons disclosed a retractable and concealable rearward light system for a vehicle. In U.S. Pat. No. 6,923,564 dated Aug. 2, 2005, Steward disclosed a selectively deployable driving lights. In U.S. Pat. No. 6,260,990 dated Jul. 17, 2001, Saunders disclosed truck lights. In U.S. Pat. No. 6,409,367 dated Jun. 25, 2002, Pratt disclosed a rear mounted vehicle lighting system. In European Patent Application No. EP 3351429A1 dated Jan. 23, 2018, Tagliatti disclosed foldable position lights.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a laterally extendable backup light system for placement on the trailer of the 18-wheeler tractor trailer truck. The lights of the present invention would be mounted underneath an outer edge of the trailer of the tractor-trailer so that they would be extendable laterally away from the edge of the trailer so that the light portion of the present invention would extend far enough outwardly to travel beyond the outer edge of the trailer so that the beam of light emanating therefrom would illuminate the area behind the rear of the trailer. An air cylinder operated by an electrical actuator controlled by the driver and/or the transmission of the truck would actuate the light portion of the present invention so that the light portion would extend from an enclosure of the present invention so that the light would extend beyond the edge of the trailer of the truck-trailer when the transmission is placed in reverse and then the light portion would be retracted back into the enclosure by an electrical actuator when the transmission is taken out of reverse.

An object of the present invention is to provide a backup light system for use on a tractor-trailer truck. A further object of the present invention is to provide a laterally extendable back up light system which extends far enough beyond the edge of the trailer to illuminate the rear area behind the tractor-trailer truck. A further object of the present invention is to provide a backup light for a trailer which can be easily operated by a user. A further object of the present invention is to provide a backup light system for a trailer which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
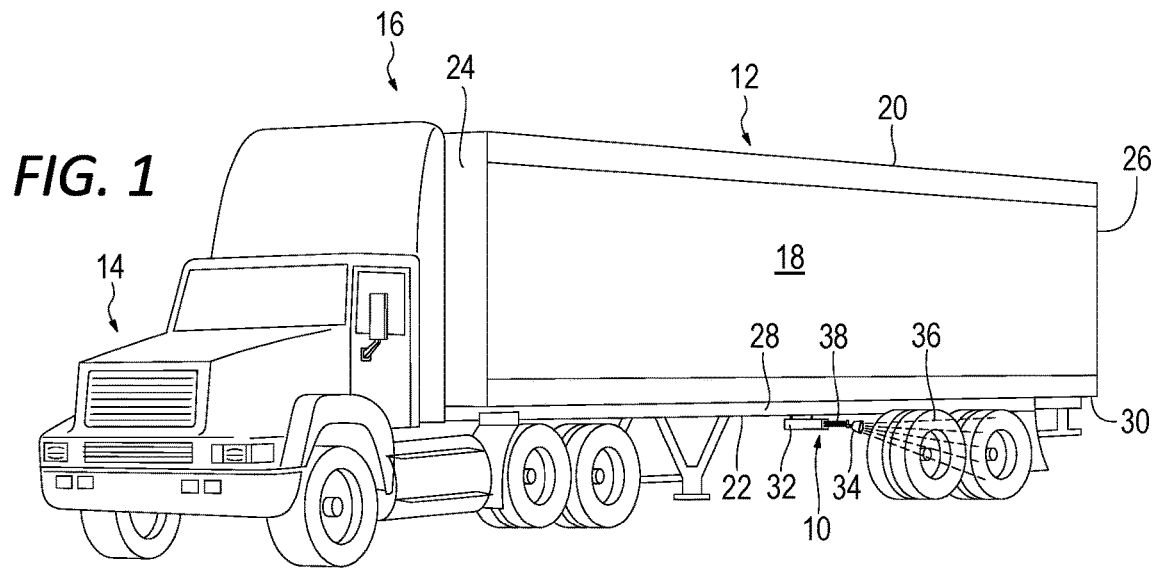
FIG. 1 is a perspective view of the present invention shown in operative connection.

With regard to reference numerals used, the following numbering is used throughout the drawings.

10 present invention
12 trailer
14 tractor
16 tractor trailer/semi tractor-trailer truck
18 side
20 top
22 bottom
24 front
26 rear
28 frame member
30 underside
32 housing/enclosure
34 light portion
36 light beam
38 shaft
40 mounting bolts
42 electrical power supply/battery
44 air tank
46 base
48 pivot
50 air cylinder
51 piston
52 first solenoid
54 first air valve
56 first air line
58 second solenoid
60 second air valve
62 second air line 64 actuator
66 air line
68 electrical wiring harness
70 electrical wiring harness
72 electrical conduit
74 enclosure
76 transmission reversing light switch
78 backup light
80 backup lights on
82 backup lights off
84 actuator on
86 spring

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a laterally extending backup light system for a tractor-trailer truck is disclosed and which is generally indicated by reference number 10.

The present invention 10 is designed for and intended for use mainly on commercial vehicles such as tractor trailers and buses which have a braking system which utilizes an air brake system. These type braking systems are governed by Department of Transportation Rules and Regulations and operate so that the air in these systems is typically maintained at the relatively high pressure of about 100-120 pounds per square inch (psi). These type air brake systems are set to close down at about 20-40 psi and may have a low air pressure warning device which actuates at about 55 psi according to 49 CFR Sec. 393.51. It should be understood that the present invention 10 is designed for relatively high pressure air brake systems wherein the integrity, i.e., without leaks, of the air brake system must be maintained so that the air pressure in the system is maintained at a relatively high pressure at all time the vehicle is operating.

Turning to FIG. 1, therein is shown the present invention 10 disposed on a trailer 12 behind the tractor 14 of the tractor-trailer truck 16 attached to the side 18 of the trailer wherein the trailer 12 has a side 18, a top 20, a bottom 22, a front 24 and a rear 26 wherein the present invention 10 is connected to any suitable frame member 28 underneath 30 the trailer 12 of the tractor-trailer truck 16. It can be seen that the present invention 10 has a housing 32 and a light portion 34 extending from the enclosure so that the light portion shines a light beam 36 to the rear 26 of the trailer 12 of the tractor-trailer 16. The light portion 34 of the present invention 10 is mounted on a shaft 38 which extends from the enclosure 32 of the present invention 10. While FIG. 1 shows only the driver side of the tractor trailer 16, the present invention 10 may be mounted on both the driver and passenger side of the tractor trailer. The present invention 10 may also be used on other type trucks, e.g., a straight truck or bus, with air brake systems or a free standing independent reserve air supply and which have no trailer.

Figure 2:
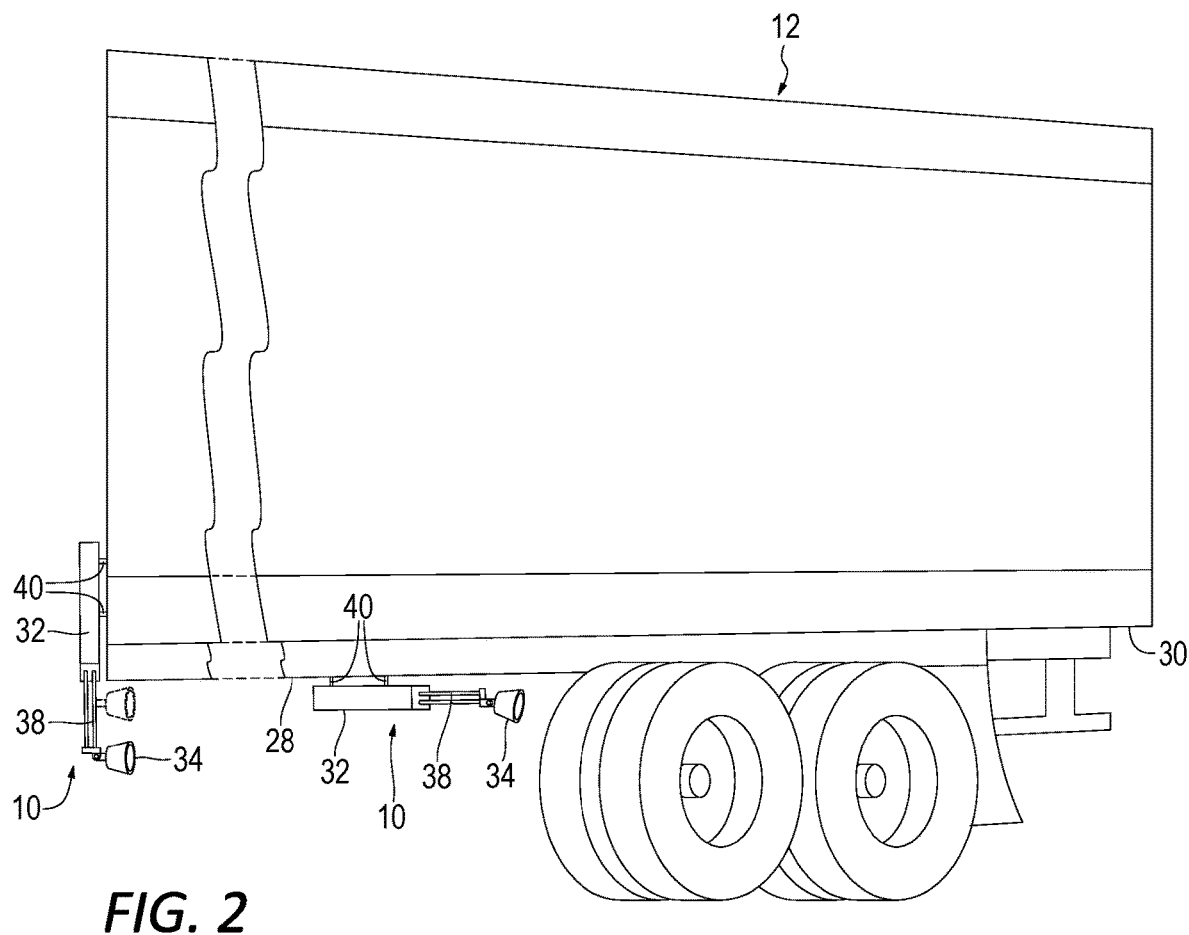
FIG. 2 is a perspective view of the present invention shown in operative connection.

Turning to FIG. 2, therein is shown the present invention 10 mounted on the underside 30 of the trailer 12 having an enclosure 32 which is attached to the frame 28 of the trailer 12 using a plurality of mounting bolts 40 as described relative to FIG. 1. Also, shown is the present invention 10 mounted vertically on trailer 12 showing the light 34 in an extended and a retracted position along with other previously disclosed features.

Figure 3:
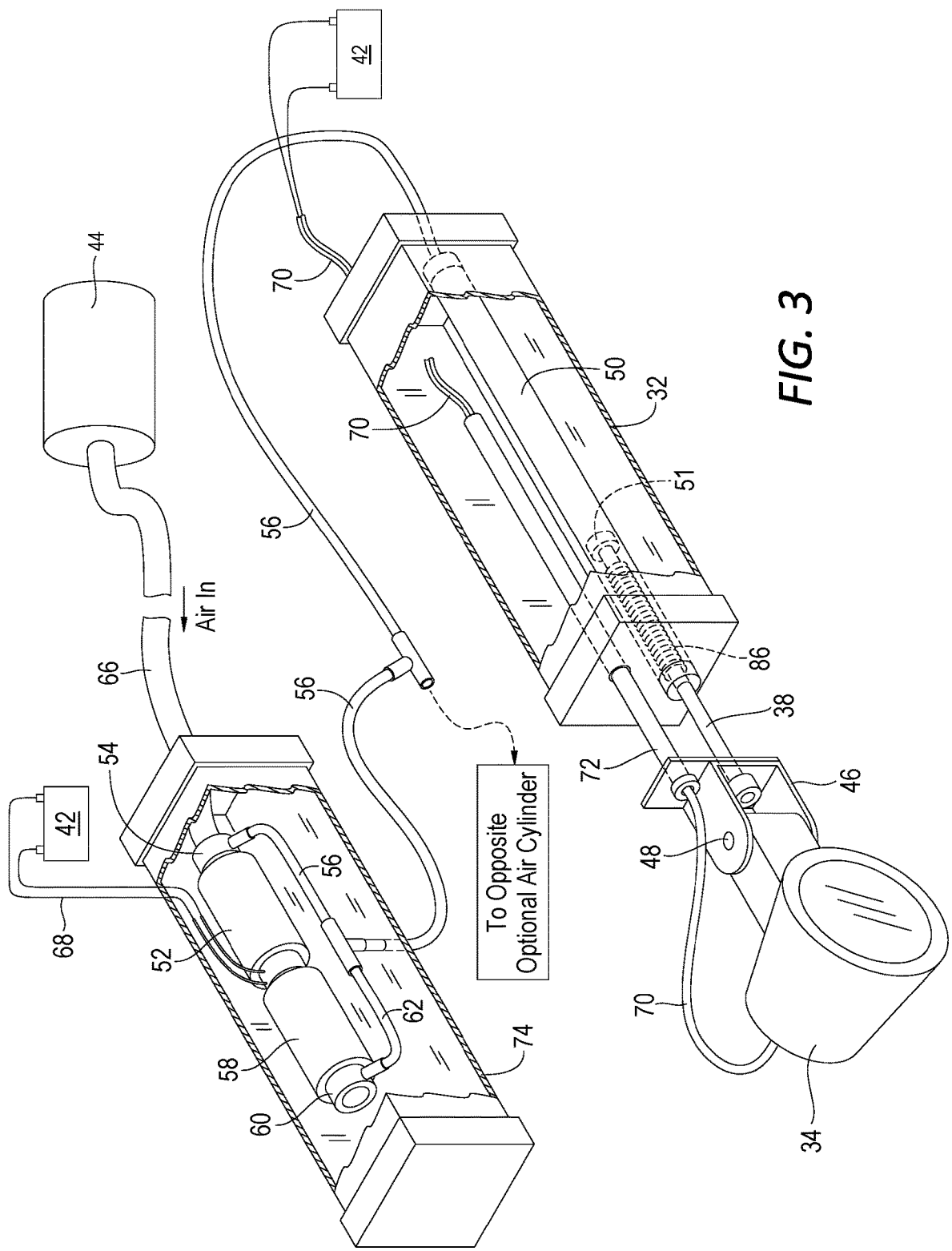
FIG. 3 is a perspective view of the light portion of the present invention being extended from the housing.

Turning to FIG. 3, the present invention 10 operates on a conventional 12-volt electrical system and conventional air supply which are expected to be supplied by the vehicle electrical power supply 42, e.g., a battery, and its air supply, e.g., an air tank 44. The present invention 10 includes an enclosure 32 containing the light portion 34 which light is mounted on an adjustable base 46 so that the light pivots angularly at 48 wherein base 46 mounts onto a shaft 38 having a piston 51 thereon which extends from and retracts into an air cylinder 50 which operates due to air pressure received through air line 56 controlled by a first solenoid 52 connected to a first air valve 54. Air from the truck/tractor 16 air tank 44 supplies air to the first air cylinder 54 through air line 66. Electrical power from the truck/tractor 14 electrical power supply 42 is supplied to the first and second solenoids 52, 58 through electrical wiring harness 68; and, to the light portion 34 through electrical wiring harness 70. Once the vehicle 14 has its transmission and transmission switch 76 placed into the reverse position, the 12-volt current actuates the number one solenoid 52 allowing the backup lights 34 to come on and the number one solenoid to open, thereby allowing air from the supply air tank 44 to travel to the air cylinders 50 which will then extend outwardly allowing the driver to view of the rear of his or her surroundings so as to avoid backing into an object. After the vehicle 14 is taken out of reverse the lights 34 will go out and the number one solenoid 32 will close. In order to close air cylinder 50 it must have its air exhausted and be retracted due to action of a second solenoid 58 connected to a second air valve 60 through second airline 62 which is actuated by actuator 64 which could be e.g., a button, mounted in the cab of the truck tractor 16 where it can be operated by the driver of the truck. The driver will push actuator button 64, or the like, activating the number two solenoid 58, which will open the second air valve 60 thereby allowing the air in the cylinder 50 to exit so that the light portion 34 will then retract due to a spring inside the air cylinder which spring biases the air cylinder toward the closed/retracted position.

The base 46 of light portion 34 also has an extendable/retractable stabilizing electrical conduit shaft 72 which encloses the electrical wires 70 and helps weatherproof and waterproof enclosure 32.

While FIG. 3 shows a enclosure 74 as being separate for ease of illustration, this enclosure and its internal components may be contained within the main enclosure 32 for mounting on the truck tractor 16.

A light portion 34 is mounted to the enclosure/housing 32 so that it will emit light to the rear 26 of the trailer 12 when the light portion 34 is turned on. The light portion 34 could comprise any type of light emitting device including incandescent, fluorescent or light emitting diodes as would be done in the standard manner by one skilled in the art. It is expected that the present invention 10 should be mounted in front of the rear tandem wheels of the trailer 12 or in front of the drive axle of a straight truck.

Figure 4:
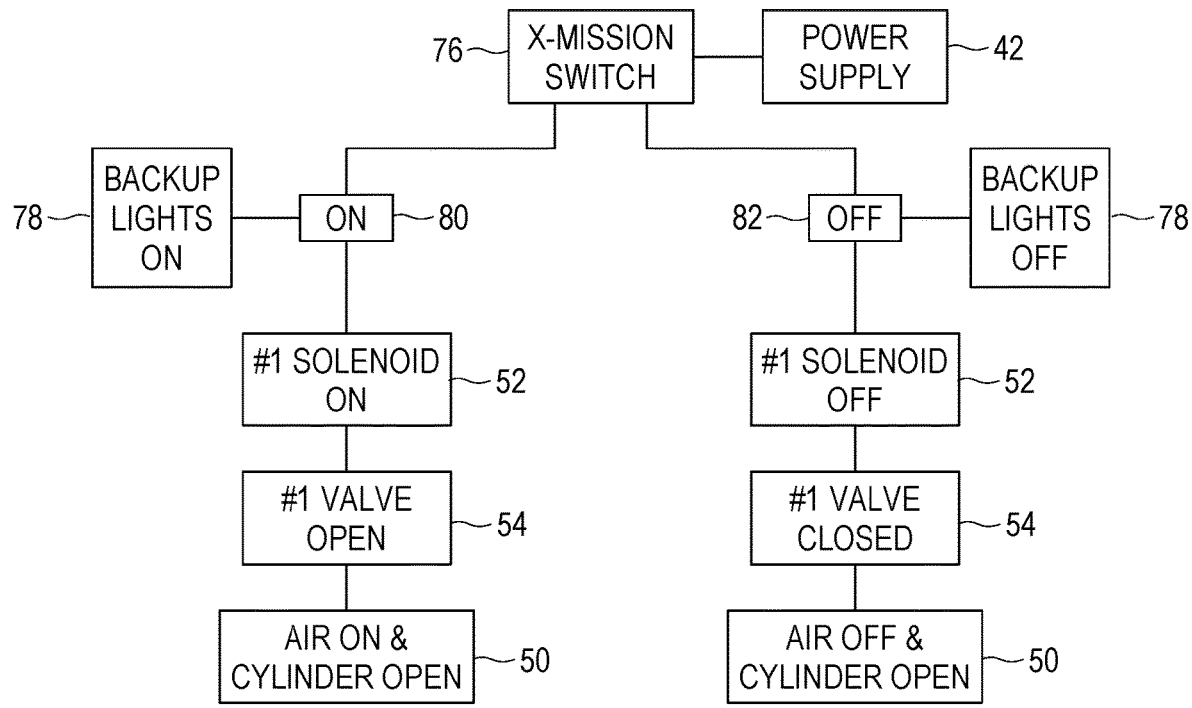
FIG. 4 is an electrical flow diagram of parts of the present invention.
Figure 5:
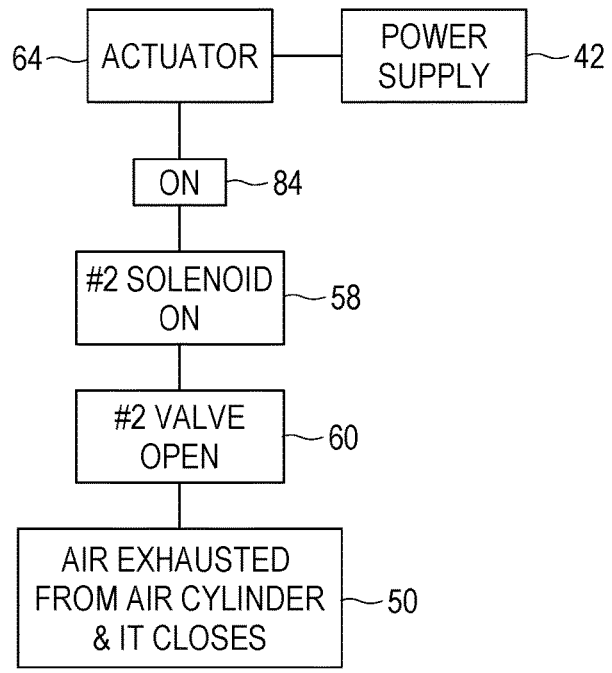
FIG. 5 is an electrical flow diagram of parts of the present invention.

Turning to FIGS. 4-5, therein is shown an electrical flow diagram which includes the battery 42 of the tractor-trailer 16, the transmission reversing switch 76, so that the present invention 10 and backup lights 78 (this includes light portion 34 of the present invention 10) come on as indicated at 80 and thereby turning on the first solenoid 52 and first air valve 54 and opening air cylinder 50. When the transmission is taken out of reverse, the backup lights 78 are turned off as indicated at 82 so that the first solenoid 52 is turned off which closes the first air valve 54 so that the air is cut off to air cylinder 50; however, because air is still contained in the air cylinder 50 it remains open until the driver actuates actuator 64 to the on position as shown at 84 which actuates the second solenoid 58 which opens the second air valve 60 so that the air cylinder 50 has its air is exhausted which allows the air cylinder to retract because it is spring-loaded so that the spring 86 biases the air cylinder 50 to the closed position.

In summary and by reference to FIGS. 1-5, as would be understood by one skilled in the art, the present invention discloses a method of illuminating surrounding rear areas of a vehicle while backing up, including the steps of mounting a first housing along one side of a body of the vehicle, the first housing containing a cylinder with a piston within having a shaft extending through one end of the first housing; attaching a movable bracket to a distal end of the shaft outside of the first housing; mounting a backup light on the bracket; and, activating the piston for extending the bracket laterally from the body when a driver of the vehicle moves into reverse gear of the vehicle and simultaneously activating the backup light for illuminating a rear and surroundings while the vehicle is during backing up in which the cylinder is an air cylinder, and, in which the vehicle has an air braking system including an air tank containing compressed air. Further, in which a second housing is provided containing a solenoid activated switch for directing compressed air from the air tank to the cylinder for activating the piston while the vehicle is backing up and releasing air pressure in the cylinder when the vehicle is no longer backing up whereby a spring in the cylinder returns the piston to a standby position thereby retracting the bracket and backup light. Also, including the step of mounting the backup light pivotally on the bracket and positionally adjusting the backup light to a preferred orientation in which the vehicle is selected from a group including a truck and a trailer. Also, including the step of mounting the first housing in front of rear wheels of the vehicle, and, including the step of mounting a third housing identical to the first housing on an opposite side of the vehicle so that surrounding rear areas on both sides of the vehicle are illuminated while the vehicle is backing up.

I claim:

1. A laterally tending backup light system for a vehicle, comprising:
    a) a first housing mounted along one side of a body of said vehicle;
    b) a movable bracket adjacent one and of said first housing;
    c) an air cylinder within said first housing containing a piston having a shaft extending through said one end of said first housing for supporting said bracket, said vehicle having an air braking system including an air tank containing compressed air;
    d) a solenoid activated switch for directing compressed air from said air tank to said cylinder for activating said piston while said vehicle is backing up;
    e) a backup light mounted on said bracket;
    f) wherein said shaft extends from said cylinder laterally from said body when a driver of said vehicle moves into reverse gear of said vehicle and simultaneously activates said backup light for illuminating a rear area while said vehicle is backing up; and
    g) an actuatable switch for releasing air pressure in said cylinder when said vehicle is no longer backing up whereby said cylinder returns said piston to a standby position retracting said bracket and backup light.

2. The backup light system of claim 1, in which said backup light is pivotally mounted on said bracket to permit positional adjustment of said backup light.

3. The backup light system of claim 2, in which said first housing is located in front of rear wheels of said vehicle.

4. The backup light system of claim 3, having a third housing identical to said first housing mounted on an opposite side of said vehicle so that surrounding rear areas on both sides of said vehicle are illuminated while said vehicle is backing up.

5. A method of illuminating surrounding rear areas of a vehicle while backing up, comprising the steps of:
    a) mounting a first housing along one side of a body of the vehicle, the first housing containing an air cylinder with a piston within having a shaft extending through one end of the first housing, said vehicle having an air braking system including an air tank containing compressed air;
    b) attaching a movable bracket to a distal end of the shaft outside of the first housing;
    c) mounting a backup light on the bracket;
    d) activating the piston using a second housing containing a solenoid activated switch for directing compressed air from the air tank to the cylinder for activating the piston while the vehicle is backing up and for extending the bracket laterally from the body when a driver of the vehicle moves into reverse gear of the vehicle and simultaneously activating the backup light for illuminating arear and surroundings while the vehicle is during backing up; and
    e) releasing air pressure in the cylinder where the vehicle is no longer backing up whereby a spring in the cylinder returns the piston to a standby position thereby retracting the bracket and backup light.

6. The method of claim 5, in which the backup light is pivotally mounted on the bracket to permit positional adjustment of the backup light.

7. The method of claim 6, in which the first housing is located in front of rear wheels of the vehicle.

8. The method of claim 7, having a third housing identical to the first housing mounted on an opposite side of the vehicle so that surrounding rear areas on both sides of the vehicle are illuminated while the vehicle is backing up.

\* \* \* \* \*